C. H. HAPGOOD.
MILKING MACHINE SYSTEM.
APPLICATION FILED MAY 28, 1921.

1,421,773.

Patented July 4, 1922.
3 SHEETS—SHEET 1.

WITNESS:

INVENTOR
Cyrus Howard Hapgood
BY
ATTORNEY.

C. H. HAPGOOD.
MILKING MACHINE SYSTEM.
APPLICATION FILED MAY 28, 1921.
1,421,773.
Patented July 4, 1922.
3 SHEETS—SHEET 2.
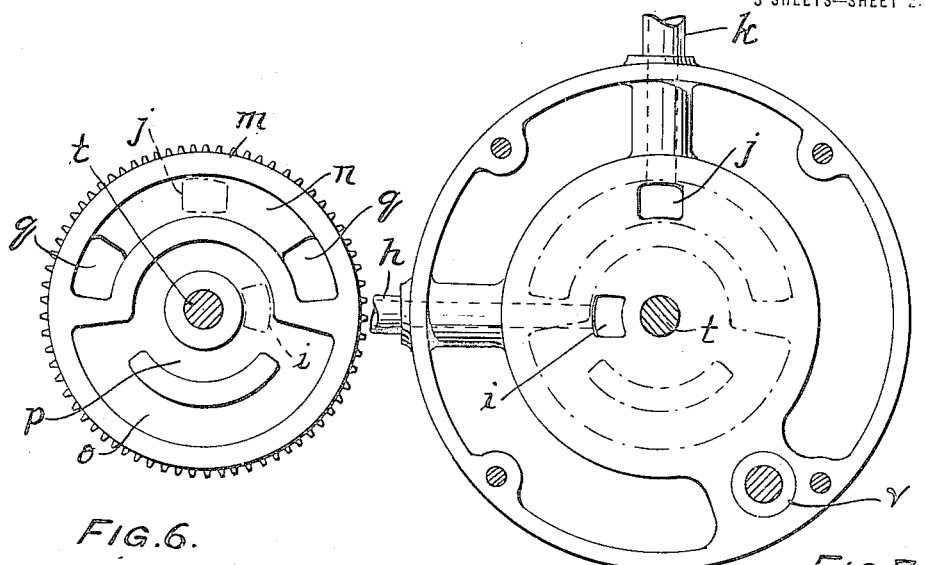
FIG. 6.
FIG. 7.
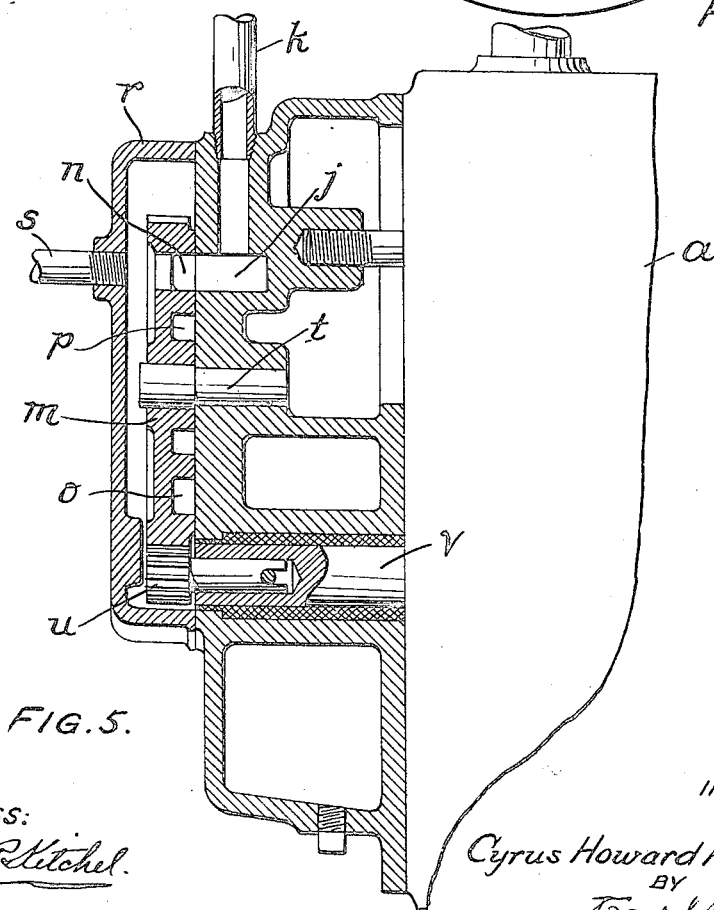
FIG. 5.
WITNESS:
Rob R Kitchel.
INVENTOR
Cyrus Howard Hapgood
BY
Frank S. Busser
ATTORNEY.

C. H. HAPGOOD.
MILKING MACHINE SYSTEM.
APPLICATION FILED MAY 28, 1921.

1,421,773.

Patented July 4, 1922.
3 SHEETS—SHEET 3.

WITNESS:

INVENTOR
Cyrus Howard Hapgood
BY
Frank S. Busser
ATTORNEY.

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

MILKING-MACHINE SYSTEM.

1,421,773. Specification of Letters Patent. Patented July 4, 1922.

Application filed May 28, 1921. Serial No. 473,254.

*To all whom it may concern:*

Be it known that I, CYRUS HOWARD HAPGOOD, a citizen of the United States, residing at Nutley, county of Essex, and State of New Jersey, have invented a new and useful Improvement in Milking-Machine Systems, of which the following is a full, clear, and exact description, reference being had to the accompanying drawings, which form a part of this specification.

Milking machine systems are known involving the use of double chamber teat cups the inner chambers of which are connected with the milk pail, a vacuum pump, a master pulsator, and a two pipe line system comprising a vacuum pipe line connected with the milk pail and a pulsation pipe line wherein pulsations, produced by the master pulsator, are transmitted to the secondary pulsator, the latter operating to connect the outer teat cup chambers alternately with air and with the vacuum pipe line directly or through the milk discharge. An example of such a system is found in the Forsyth Patent No. 1,257,688. Such a system is in successful commercial use. The smaller the plant, however, the more expensive is the installation relative to the size of the plant; and where the herd of cows to be milked number as low as ten or twelve, it is desirable to provide an apparatus involving a smaller initial outlay and possibly also a smaller upkeep charge.

The object of my invention is to modify the existing commercial system so as to attain these objects. One of the features of the system is the provision of a single pipe line wherein pneumatic pulsations, produced by a master pulsator, are effective to create a partial vacuum in the milk pail and in the inner teat cup chambers and also to operate the secondary valve to create pneumatic pulsations in the outer teat cup chambers. The installation of a single pipe line is obviously less expensive than the installation of a double pipe line. Moreover, less power is required to create pneumatic pulsations in a single pipe than to do this and in addition thereto maintain a vacuum in another pipe line. Therefore a smaller pump may be used, thereby reducing the cost of installation and the power required for operation.

I am aware that there is nothing broadly novel in the provision of a single pipe line operable by a master pulsator to exhaust air from the pail and from the inner teat cup chambers and to create pneumatic pulsations in the outer teat cup chambers. Such a system is disclosed in the Leitch Patent No. 1,163,161, dated December 7, 1915. The utilization, in such a system, of a secondary valve that is operable by the pulsations in the single pulsation pipe line to produce pulsations in the outer teat cup chambers has also been patented. See, for example, the Leitch Patent No. 1,196,001. While the inventions of these patents are incorporated in my improved system, I have so far modified these patented features and combined them with other features as to adapt the system to commercial requirements.

A preferred embodiment of the invention is illustrated in the accompanying drawings, wherein—

Figure 2:
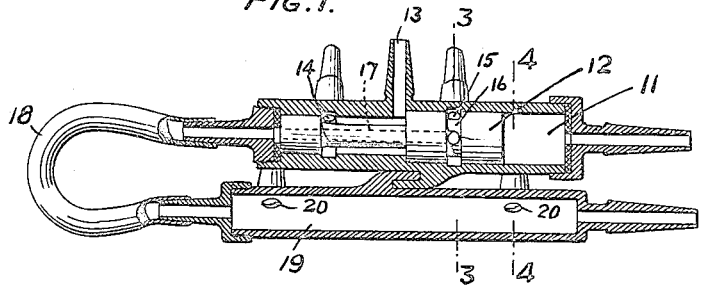
Fig. 2 is a longitudinal sectional view of the claw.
Figure 3:
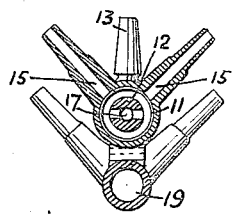
Figure 4:
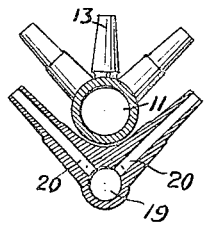

Figs. 3 and 4 are respectively cross-sections on the lines 3—3 and 4—4 of Fig. 2.

Fig. 5 is a longitudinal section through the vacuum pump head and primary pulsator.

Fig. 6 is a face view of the rotary primary pulsator valve looking toward the inside or working face thereof.

Fig. 7 is an end view of the pump head and primary pulsator.

Figure 8:
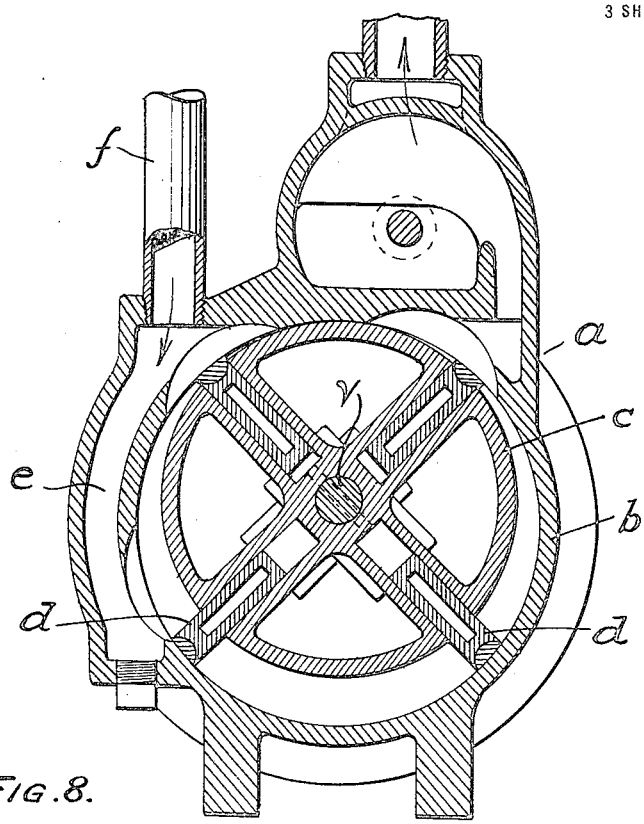

Fig. 8 is a cross-section through the vacuum pump.

Figure 9:
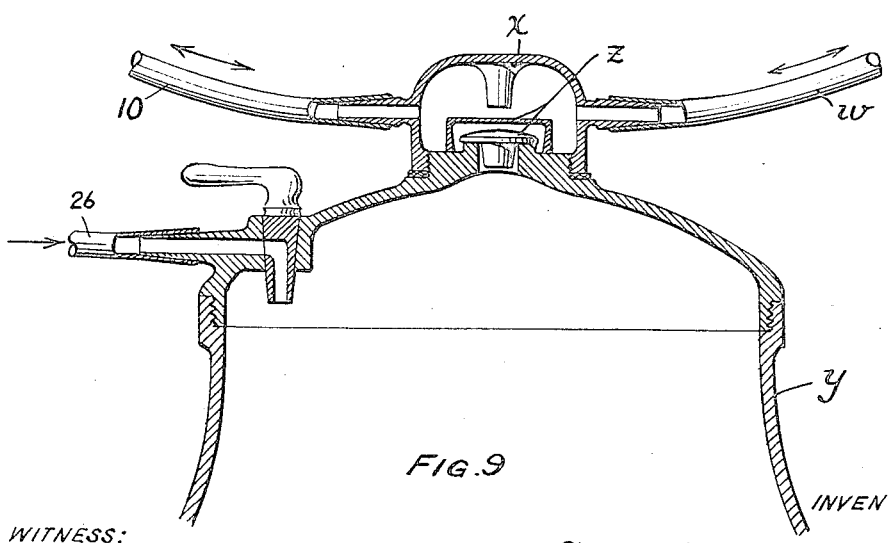

Fig. 9 is a vertical sectional view of the top of the milk pail and pipe connections thereto.

The vacuum pump $a$ comprises (see Fig. 8) a housing $b$, a rotor $c$ carrying vanes $d$, and an inlet chamber $e$, the latter having a ported connection with the bore of the housing. The pump is of the type shown in the Leitch Patents No. 1,367,554, dated February 8, 1921, and No. 1,378,881 dated May 24, 1921, and the Hall Patent No. 1,374,650, dated April 12, 1921.

Figure 1:
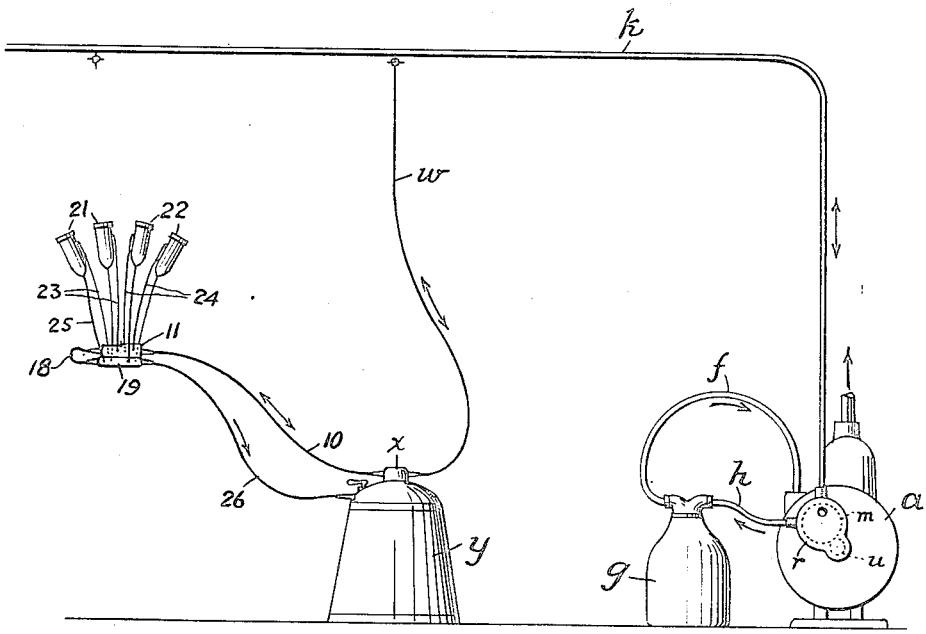
Fig. 1 is a diagram of the entire system.

The inlet chamber of the pump is connected by means of a pipe $f$ (see Fig. 8) with a vacuum reservoir and stabilizer $g$ (see Fig. 1). The latter is connected, by means of a pipe *h* (see Fig. 7) with a port or passage *i* in the pump head, which forms a seat for the rotary primary pulsator valve.

The single pipe line *k* (see Fig. 1) is connected (see Figs. 5 and 7) with another passage *j* in the pump head. Both passages *i* and *j* open on the face of the valve seat.

The rotary primary pulsator valve *m* is provided with two outer arcuate grooves *n* and *o* (see Fig. 6) adapted to register alternately with the port *j* and an inner circular groove *p* in constant communication with the outer groove *o*. The groove *n* has openings *q* through the valve into the valve casing *r* (see Fig. 5), which has a port *s* open to the atmosphere or other source of pneumatic pressure.

The valve *m* (see Fig. 5) turns on a pin *t* secured to the valve seat and has a toothed periphery whereby it is driven from a pinion *u* on the shaft *v* of the rotor of the pump.

The single pipe line *k* (see Fig. 1) is adapted for connection at different points along its length with a pulsation pipe *w* of an individual milking machine unit. The pipe *w* (see Figs. 1 and 9) is secured to a nozzle on a casing *x* screwed to the top of a milk pail *y*. The casing *x* forms a pneumatic pulsation passage or chamber that communicates with the interior of the pail by means of an orifice in the pail cover, such orifice being closed by the compound check valve *z*. This casing *x* and compound check valve *z* are more particularly described in the Leitch Patent No. 1,394,433, dated October 18, 1921.

The casing *x* is provided with another nozzle to which is connected one end of a pulsation pipe 10, the other end being secured to a nozzle on the larger diameter end of the valve chamber 11 of the claw shown in Figs. 1–4. Within this valve chamber is a secondary valve 12 having two neck-connected pistons of two diameters working respectively in the wider and narrower ends of the valve chamber. The valve chamber has a port 13 opening to the atmosphere or other source of pressure and two pairs of ports 14 and 15. The piston of larger diameter has a groove 16. Passage 17 extends from this groove to the valve end of smaller diameter.

The smaller diameter end of the valve chamber 11 has a nozzle connected by a pipe 18 with a nozzle on the end of a milk chamber 19 removably connected to the valve chamber 11. The milk chamber 19 has a pair of ports 20.

The teat cups comprise two pairs. The outer chambers of one pair of cups 21 are connected by means of pipes 23 with the ports 14. The outer chambers of the other pair of cups 22 are connected by means of pipes 24 with the ports 15. The inner teat cup chambers are connected by means of pipes 25 with the ports 20 of the milk chamber of the claw.

A pipe 26 connects the milk chamber of the claw with the pail *y*.

In operation, the vacuum pump *a* exerts a constant suction on the pipe *f*, the vacuum reservoir and stabilizer *g*, the pipe *h*, and the grooves *p* and *o* of the valve. When the pulsator valve *m* is in the position shown in Figs. 6, 7 and 8, the groove *o* is closed from communication with the pulsation pipe line *k*, which, through passage *j*, groove *n*, ports *q*, interior of valve casing *r* and port *s*, is open to pressure. As the valve *m* turns the groove *n* is closed from communication with the passage *j* and pipe line *k* while the groove *o* registers therewith, thereby connecting the pipe line *k* with suction. Thereby alternate vacuum waves and pressure waves are produced in the pipe line *k*.

During the period that the pipe line *k* is closed against vacuum, there is a slight rise in the vacuum in the vacuum reservoir and stabilizer *g*. The degree of fluctuation of vacuum in the vacuum reservoir and stabilizer *g* will depend on its size. The larger the tank the smaller will be the fluctuation. With the tank omitted altogether, the vacuum pump would work, half the time, against a dead space. With the tank, the vacuum pump is continuously functioning.

The pneumatic pulsations in the pipe line *k* are transmitted, through pipe *w*, to the casing *x* on the pail *y* and, through pipe 10, to the larger end of the secondary valve 12.

During the vacuum wave in the pipe line *k*, air is exhausted from the milk pail *y*. During the pressure wave, the compound check valve *z* closes. Thereby a partial vacuum is established and maintained in the pail *y*, pipe 26, milk chamber 19 and the inner chambers of the teat cups.

During the vacuum wave in the pipe line, the secondary valve 12 moves to the right, due to the constant atmospheric pressure against the left hand end of the larger head of the valve. During the pressure wave, the secondary valve 12 moves to the left, due to the constant partial vacuum operating against the smaller head of the valve.

When the valve 12 is in the position shown in Fig. 2, the outer chambers of teat cups 22 are connected, through pipes 24, ports 15, groove 16, passage 17 and pipe 18, with the milk chamber 19 and therefore with suction. At the same time, the outer chambers of teat cups 21 are connected through pipes 23, interior of valve chamber 11 and port 13, with atmosphere.

When the valve 12 moves to the opposite end of its chamber the outer chambers of teat cups 21 are connected with suction, while the outer chambers of teat cups 22 communicate with atmosphere.

During the operation of the secondary valve 12, the vacuum in the pail fluctuates within narrow limits—about one inch. As the pail fills with milk, it is found that the fluctuation increases to about an inch and a half, the minimum degree of vacuum remaining the same and the maximum rising.

Having now fully described my invention, what I claim and desire to protect by Letters Patent is:—

1. A milking machine system comprising a pneumatic pulsation pipe line, a master pulsator adapted to create pneumatic pulsations in said pipe line, a milk pail, said pipe line connecting with the pail, means to prevent flow of air from the pipe line to the milk pail while allowing flow of air from the pail to the pipe line, a set of double chamber teat cups, a claw comprising a milk chamber and a valve chamber, the latter having an air port, pipe connections between the outer chambers of the teat cups and the valve chamber, a secondary valve in the valve chamber, said pipe line connecting with the valve chamber and controlling the secondary valve, a pipe connection from the inner teat cup chambers to the milk chamber of the claw, a pipe connection from the milk chamber of the claw to the pail, and an air connection between the valve chamber and the milk chamber, said valve adapted to connect each outer teat cup chamber alternately with atmosphere and through the last named connection with the milk chamber of the claw.

2. A milking machine system comprising a set of double chamber teat cups, a milk pail connected with the inner teat cup chambers, a pneumatic pulsation pipe line communicating with the milk pail, means to prevent flow of air from said pipe line to the pail, a master pulsator adapted to create pneumatic pulsations in said pipe line, a secondary valve adapted to connect each outer teat cup chamber alternately with pressure and with the milk pail, said pneumatic pulsation pipe line connecting also with the secondary valve and controlling its operation, whereby in a single pipe line system the primary pulsations therein effect exhaust of air from the milk pail and from the inner chambers of the teat cups and operate a secondary valve to admit air to the outer chambers of the teat cups and exhaust air therefrom into the milk discharge.

3. A milking machine system comprising a pulsation pipe line, a master pulsator adapted to create pulsations therein, a set of double chamber teat cups, a claw comprising a valve chamber and a milk chamber, pipe connections from the outer teat cup chambers to the valve chamber of the claw, pipe connections from the inner teat cup chambers to the milk chamber of the claw, an air connection between the two chambers of the claw, a pipe connection from the milk chamber of the claw to the milk pail, a secondary pulsator in the valve chamber of the claw, a casing forming an air passage communicating with the milk pail, a check valve between said air passage and milk pail normally preventing inflow of air from said passage to the pail and allowing outflow of air from the pail to said passage, a pipe connection between said air passage and the valve chamber of the claw, and a pipe connection between said passage and the pulsation pipe line.

4. A milking machine system comprising a primary pneumatic pulsation pipe line, a master pulsator adapted to create pulsations therein, a set of double chamber teat cups, a milk pail connected with the inner chambers of the teat cups, a secondary pulsator adapted to admit air to each teat cup and exhaust air therefrom to the milk pail, a casing forming an air passage communicating with the milk pail, a check valve between said air passage and milk pail normally preventing inflow of air from said passage to the pail and allowing outflow of air from the pail to said passage, and pipe connections from said air passage to the primary pulsation pipe line and to the secondary pulsator.

5. A milking machine system comprising a set of double chamber teat cups, a milk pail connected with the inner chambers of the teat cups, a secondary pulsator adapted to admit air to each teat cup and exhaust air therefrom to the milk pail, a pulsation pipe line, means whereby the pneumatic pulsations in the latter control the operation of the secondary pulsator and exhaust air from the milk pail, a vacuum pump, a master pulsator applied direct to the pump and connected with a source of pressure and with the pulsation pipe line, a vacuum reservoir and stabilizer, and pipe connections therefrom to the master pulsator and to the pump respectively, the master pulsator operating to connect the pulsation pipe line alternately with the vacuum reservoir and stabilizer and with pressure.

6. A milking machine system comprising a set of double chamber teat cups, a milk pail connected with the inner chambers of the teat cups, a secondary pulsator adapted to admit air to each teat cup and exhaust air therefrom to the milk pail, a pulsation pipe line, means whereby the pneumatic pulsations in the latter control the operation of the secondary pulsator and exhaust air from the milk pail, a vacuum pump, a master pulsator comprising a valve seat applied to the pump and a valve operating on said seat and connected with a source of pressure, the pulsation pipe line being connected with the valve seat, a vacuum reservoir and stabilizer, pipe connections therefrom respectively to the valve seat and to the vacuum chamber of the pump, there being ports and passages in the valve and valve seat adapted in the operation of the valve to connect the pulsation pipe line alternately with the vacuum reservoir and stabilizer and with said source of pressure.

In testimony of which invention, I have hereunto set my hand, at New York, on this 25th day of May, 1921.

CYRUS HOWARD HAPGOOD.

Witnesses:
JOHN G. PAUL,
GEO. D. TALLMAN.